March 10, 1931. A. WÖRNER 1,796,134
VITAMINIZING FOOD PRODUCTS
Filed Dec. 6, 1928   2 Sheets-Sheet 1
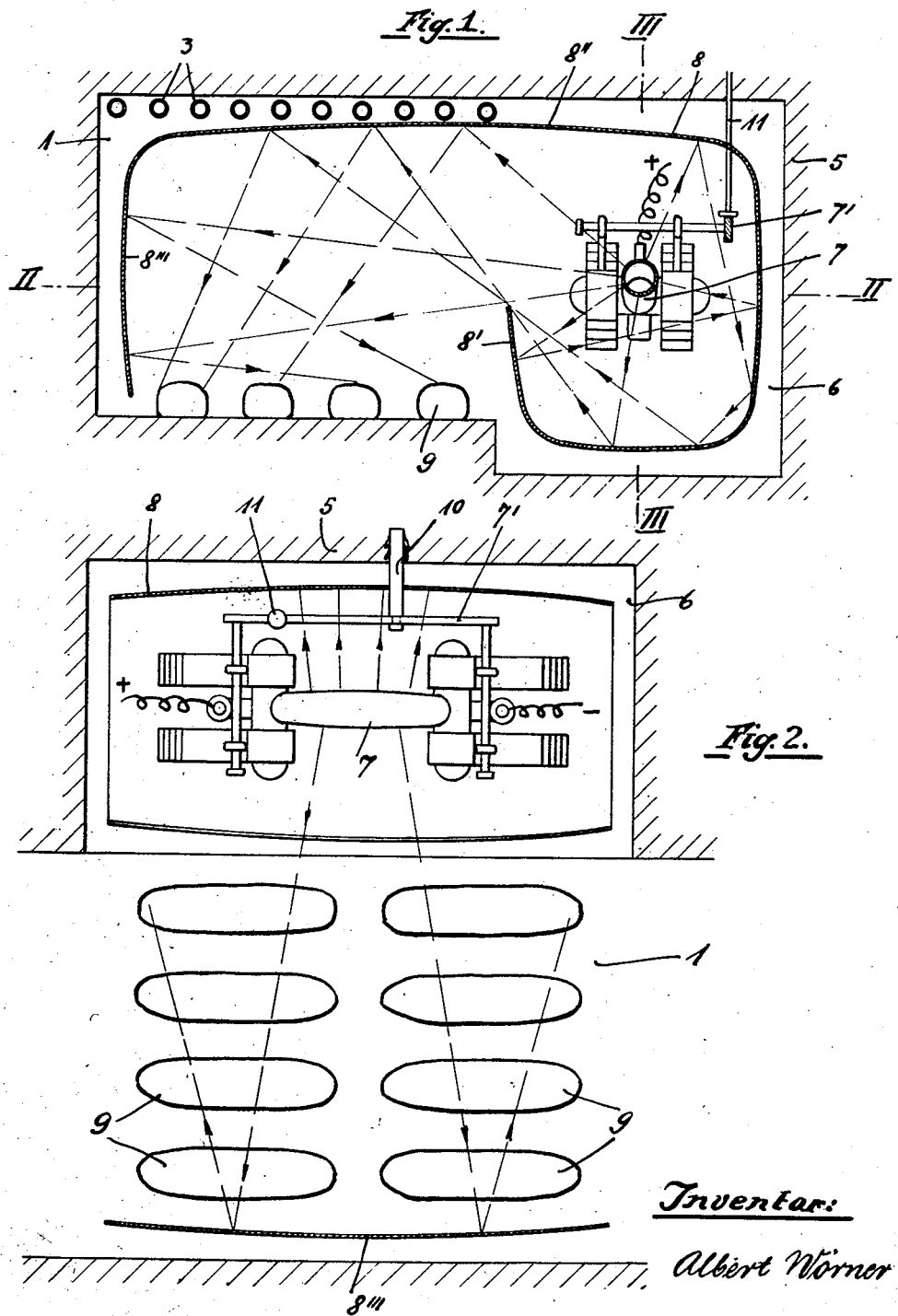

March 10, 1931.　　　A. WÖRNER　　　1,796,134
VITAMINIZING FOOD PRODUCTS
Filed Dec. 6, 1928　　　2 Sheets-Sheet 2

Inventor:
Albert Wörner
by Kumovind
atty.

Patented Mar. 10, 1931

1,796,134

UNITED STATES PATENT OFFICE

ALBERT WÖRNER, OF STUTTGART-CANNSTATT, GERMANY

VITAMINIZING FOOD PRODUCTS

Application filed December 6, 1928, Serial No. 324,131, and in Germany October 31, 1927.

My invention relates to the art of increasing the percentage of vitamines in food products and more especially in bread, pastry and other baker's ware, but also in food preparations for infants, in biscuits, zwiebacks and the like, in order to render such food products capable of counteracting rachitis and to increase in a general way the health promoting properties of such products.

Ultraviolet rays emitted by mercury vapour lamps or other suitable means have been used for vitaminization, but the action of such rays brings about an objectionable taste in the products, these products or the fatty matter contained therein being charred. The unpleasant smell of ozone developed by the action of ultraviolet rays on the oxygen of the air is equally objectionable.

It is an object of my invention to eliminate these drawbacks and to produce food products which are rich in vitamines without showing the above-mentioned objectionable properties.

To this end I subject the products before, during or after their production to the action of ultraviolet rays, but eliminate the direct influence of the red or heat rays. Any suitable means such as reflection, refraction or absorption may be employed for rendering the heat rays practically inactive with respect to the products treated. Preferably the heat rays are rendered available for other purposes such as the provision of top heat in baking ovens.

Preferably the oxygen is expelled from the oven or other chamber, in which the products are being treated, by introducing an inert gas such as carbon dioxide during the treatment.

My invention will now be described by way of example as performed in a baking oven.

In the drawings affixed to this specification and forming part thereof the baking oven is illustrated in a diagrammatic manner.

In the drawings,

Fig. 1 is a cross section,

Figs. 2 and 3 are sections on the lines III—III and II—II in Fig. 1, respectively.

Figure 3:
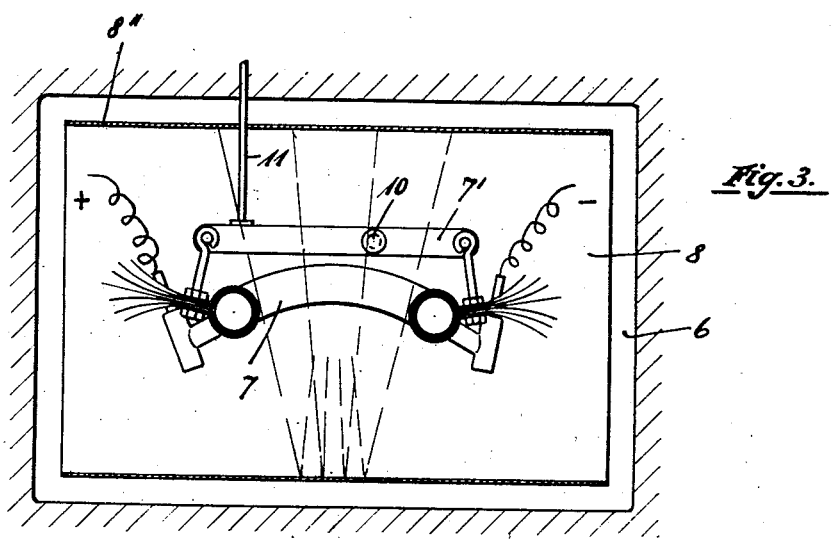

Referring to the drawings, 1 is the tunnel of the oven, 3 are so-called Perkins tubes closed at both ends and filled with a heating liquid, 6 are niches in the side walls 5 of the tunnel, 7 are mercury vapour lamps arranged in the niches, and 8 are reflectors for the lamps. As will appear from Fig. 1, these reflectors are so designed as to prevent direct radiation from the lamp 7 to the products 9 under treatment, which may be loaves, by means of a shield 8' interposed between the lamp and the loaves. The reflector 8 has a substantially horizontal extension 8'' below the roof of the tunnel 1 and a substantially vertical extension 8''' along the wall opposite the niche 6. Preferably these extensions are shaped as parabolic reflectors. The direction of radiation from the lamp 7 and the direction of the reflected rays is indicated by the arrows in Fig. 1 from which it will appear that the rays from the lamp are reflected and distributed uniformly so as to act on the articles 9 on all sides, but that any direct action of heat rays emitted from these lamps is prevented, the reflected heat rays acting on the products only indirectly without deteriorating them.

Each lamp is supported in a frame 7' of usual construction which is arranged to rock about a fulcrum 10 (Fig. 2) and a rod 11 is connected with the frame 7' by means of which the frame can be rocked on its fulcrum 10 from the outside.

Obviously any type of baking oven, dryer or other apparatus for treating food products equipped with any kind of heating means may be used for performing my process.

My process offers the further advantage that the goods are vitaminized during the baking, roasting, drying, or other treatment, and therefore as compared with the old process of vitaminization after baking, time is saved and the cost of labour is reduced.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. Apparatus for treating food products at high temperature, comprising heating means, a source of ultraviolet rays and means operative by reflection for preventing direct action of the rays emitted by said source.

2. A baking oven comprising a mercury vapour lamp and a reflector arranged to deflect the rays emitted from said lamp so as to avoid direct irradiation of the products treated in said oven.

In testimony whereof I affix my signature.

ALBERT WÖRNER.